United States Patent
Barboza et al.

(10) Patent No.: US 11,886,325 B2
(45) Date of Patent: Jan. 30, 2024

(54) NETWORK STATUS SIMULATION FOR REMOTE DEVICE INFRASTRUCTURE

(71) Applicant: BrowserStack Limited, Dublin (IE)

(72) Inventors: James Barboza, Mumbai (IN); Krishna Suravarapu, Andhra Pradesh (IN); Kunal Chowdhary, Mumbai (IN)

(73) Assignee: BrowserStack Limited, Dublin (IE)

( * ) Notice: Subject to any disclaimer, the term of this patent is extended or adjusted under 35 U.S.C. 154(b) by 0 days.

(21) Appl. No.: 17/855,653

(22) Filed: Jun. 30, 2022

(65) Prior Publication Data
US 2024/0004781 A1 Jan. 4, 2024

(51) Int. Cl.
| | |
|---|---|
| *G06F 9/44* | (2018.01) |
| *G06F 9/445* | (2018.01) |
| *G06F 9/455* | (2018.01) |
| *G06F 11/36* | (2006.01) |
| *G06F 9/54* | (2006.01) |
| *G06F 8/61* | (2018.01) |

(52) U.S. Cl.
CPC ............ *G06F 11/3664* (2013.01); *G06F 8/61* (2013.01); *G06F 9/547* (2013.01)

(58) Field of Classification Search
CPC ......... G06F 11/3664; G06F 8/61; G06F 9/547
See application file for complete search history.

(56) References Cited

U.S. PATENT DOCUMENTS

| | | | | |
|---|---|---|---|---|
| 8,831,995 | B2 * | 9/2014 | Holler | H04L 63/101 |
| | | | | 705/52 |
| 11,080,177 | B1 * | 8/2021 | Schaude | G06F 11/326 |
| 11,579,595 | B2 * | 2/2023 | Chauvet | G05B 19/418 |
| 11,606,390 | B1 * | 3/2023 | Grammel | H04L 63/162 |
| 2014/0109078 | A1 * | 4/2014 | Lang | G06F 21/53 |
| | | | | 717/172 |

(Continued)

FOREIGN PATENT DOCUMENTS

| | | | | |
|---|---|---|---|---|
| CA | 2936503 | C * | 1/2021 | .......... G06F 16/178 |
| CN | 100409646 | C * | 8/2008 | |

(Continued)

OTHER PUBLICATIONS

Kapil Kumar, A Unified Web Interface for the Internet of Things, 2016, pp. 1-6. https://ieeexplore.ieee.org/stamp/stamp.jsp?tp=&arnumber=7839142 (Year: 2016).*

(Continued)

*Primary Examiner* — Mongbao Nguyen
(74) *Attorney, Agent, or Firm* — Cognition IP, P.C.; Edward Steakley; Saleh Kaihani

(57) ABSTRACT

A software development infrastructure can enable user developers to select remote hardware devices at a remote datacenter to develop and test software programs, such as web or mobile applications. The developer can remotely install an application on a selected remote device and observe a mirrored display of the remote device on a browser local to the developer. The software development infrastructure can enable the developer to test offline mode workflows of the application by blocking network traffic to and from the application but allowing network transmission to and from a streaming application installed on the remote device.

17 Claims, 5 Drawing Sheets

(56) References Cited

U.S. PATENT DOCUMENTS

| | | | |
|---|---|---|---|
| 2015/0074659 A1* | 3/2015 | Madsen | G06F 9/45558 |
| | | | 717/177 |
| 2018/0020002 A1* | 1/2018 | Duca | G06F 21/572 |
| 2018/0109434 A1* | 4/2018 | Venkiteswaran | H04L 43/50 |
| 2019/0158353 A1* | 5/2019 | Johnson | H04L 41/0803 |
| 2020/0106699 A1* | 4/2020 | Chauhan | H04L 69/14 |
| 2022/0070151 A1* | 3/2022 | Chauhan | H04L 63/0428 |
| 2022/0345311 A1* | 10/2022 | Momchilov | H04L 63/0272 |
| 2023/0195491 A1* | 6/2023 | Tu | G06F 9/45558 |
| | | | 718/1 |

FOREIGN PATENT DOCUMENTS

| | | | | | |
|---|---|---|---|---|---|
| CN | 107750441 A | * | 3/2018 | | G06F 21/606 |
| CN | 112799891 A | * | 5/2021 | | |

OTHER PUBLICATIONS

Bully Tamba, Enhancing Application Performance through OpenFlow Enabled Multi-homed Devices, 2015, pp. 1-6. https://ieeexplore.ieee.org/stamp/stamp.jsp?tp=&arnumber=7097833 (Year: 2015).*

Daniel F. Macedo, Programmable Networks—From Software-Defined Radio to Software-Defined Networking, 2015, pp. 1102-1122. https://ieeexplore.ieee.org/stamp/stamp.jsp?tp=&arnumber=7039225 (Year: 2015).*

* cited by examiner

NETWORK STATUS SIMULATION FOR REMOTE DEVICE INFRASTRUCTURE

BACKGROUND

Field

This invention relates generally to the field of enabling a remote device infrastructure for software development on a remote device, and more particularly to simulating an offline connectivity status in this environment.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The multitude of computers, mobile devices and platforms have given businesses and consumers a vast array of options when they choose a device. The plethora of choices include both hardware and software. Naturally, software, application and website developers have a keen interest in ensuring their products work seamlessly across the existing hardware and platforms, including older devices on the market. This creates a challenge for the developers to properly test their products on the potential devices and platforms that their target consumer might use. On the one hand, acquiring and configuring multiple potential target devices can strain the resources of a developer. On the other hand, the developer may not want to risk losing a potential market segment by disregarding a particular platform in his typical development cycle. Even for prominent platforms, such as iOS® and Android®, at any given time, there are multiple generations and iterations of these devices on the market, further complicating the development and testing process across multiple platforms. Even in a given platform, a variety of software, operating systems and browser applications are used by a potential target audience of a developer. This dynamic illustrates a need for a robust infrastructure that enables developers to test their products across multiple devices and platforms, without having to purchase or configure multiple devices and platforms.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
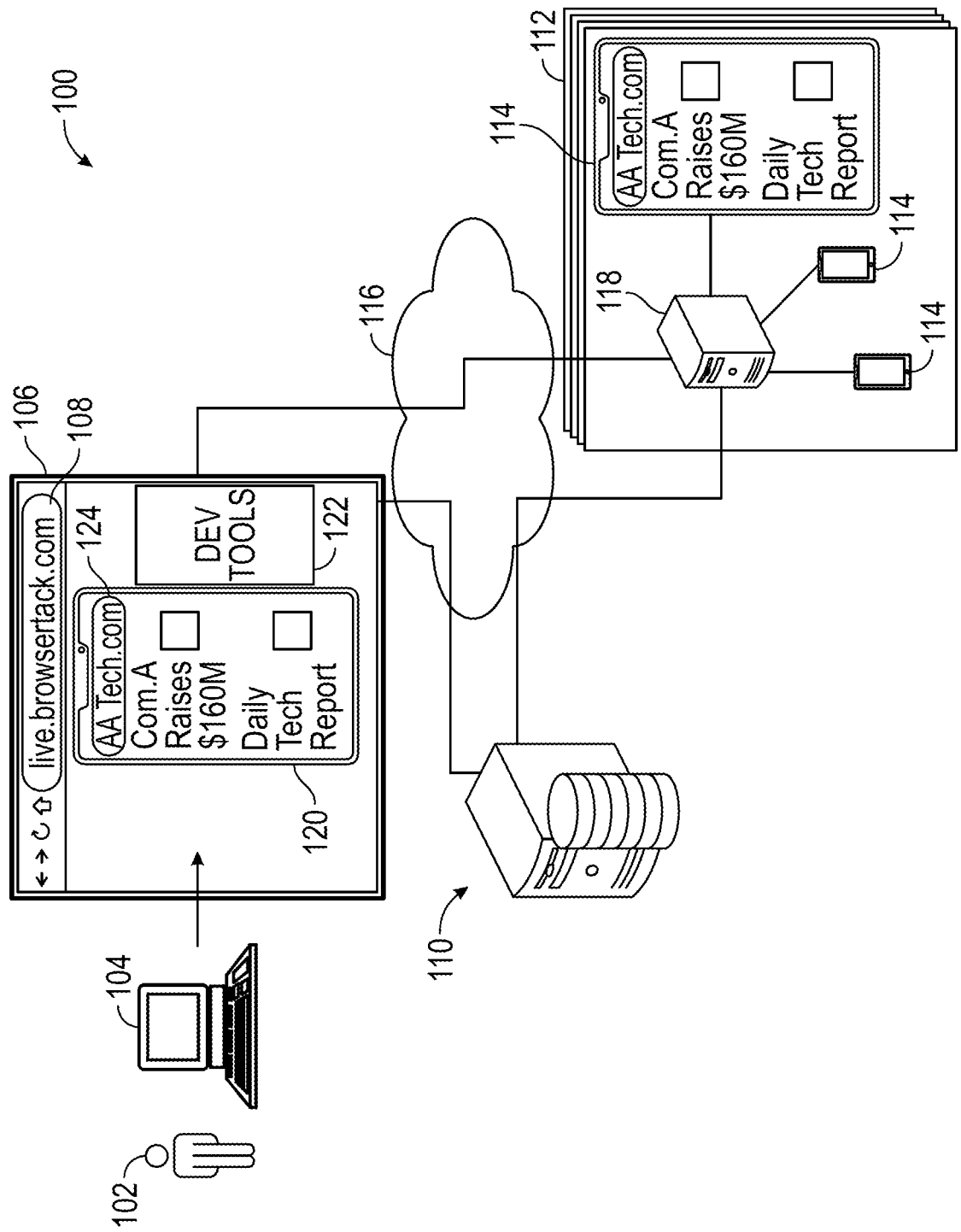
FIG. 1 illustrates an example remote development system (RDS).

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Software developers, particularly website, web application and mobile device application developers have a desire to test their products on a multitude of hardware and software platforms that their target audience may use. A variety of mobile device manufacturers provide the hardware consumers and businesses use. Examples include, devices manufactured by Apple Inc., Google LLC, Samsung Electronics Co. Ltd., Huawei Technologies Co. Ltd. and others. Similarly, a variety of operating systems for consumer electronic devices exist. Examples include Apple iOS®, Android® operating system (OS), and Windows® Mobile, Windows® Phone and others. Furthermore, end-users have a variety of choices as far as the web browser application they can use. Examples include Safari®, Chrome®, FireFox®, Windows Explorer®, and others. This variety of choice presents a difficult challenge for a web/app developer to test and develop products on potential target devices. Traditionally, the developer might have to acquire a test device and spend resources configuring it (for example, by installing a target OS, browser, etc.) as well as a secondary hardware device to connect the test device through the secondary hardware device to a local machine of the developer, in order to write code and conduct tests on the test device. The sheer variety of possible devices, operating systems, browsers and combinations of them are numerous and can present a logistical hurdle to the developer.

A testing provider can enable a remote development system (RDS), having a multitude of remote devices for a developer to connect to and conduct tests and development activity. The developer can connect to the RDS, select a remote device, select a configuration (e.g., a particular browser, etc.) and run tests and development activity using the selected remote device. The RDS can include a server powering a website or a desktop application on the client or developer-side, which the developer can use to launch a dashboard for connecting to the RDS and for conducting tests and development activity. The dashboard can include a mirrored display of the remote device presented to the developer. The RDS can capture developer inputs and transmit them to the remote device. The RDS mirrors the display of the remote device on the developer's local machine and simultaneously captures the developer's interactions inputted onto the mirrored display and transfers those commands to the remote device. In a typical case, the developer can use a keyboard and mouse to input interactions onto the mirrored display. When the remote device is a smart phone device, the RDS translates those input interactions compatible with the smart phone. Examples of smart phone input interactions include gestures, pinches, swipes, taps, and others. The remote device display is mirrored on the developer's local machine. In this manner, the developer can experience a seamless interaction with the remote device using the developer's local machine, as if the remote device were physically present at the location of the developer. The RDS can be used both for development of launched and unlaunched products.

In some scenarios, the remote device, or an application running on the remote device, may require an input from an end-user or a developer testing an end-user interaction, in a format that can require the user and the remote device to be physically in the same location, or for the user to provide an input that requires the user physically handling the remote device and/or be in the same location as the remote device. An example of this scenario is when an application requires biometric information from a user in the form of facial recognition request or fingerprint request. Another example is when an application requests access to the camera of the device its running on to use the camera as a scanner, for example, to scan a QR code, a barcode or to receive other items as an image. Software features requiring the user and the device, running the software to be in the same location can be termed same-location interactions. In these scenarios, the RDS can enable the developer to develop and test their applications, including those applications having same-location interactions.

FIG. 1 illustrates an example RDS 100. Although some embodiments use the RDS 100 in the context of testing and software development, the RDS 100 can be used to enable a remote session for any purpose. Testing is merely provided as an example context of usage area of the system and infrastructure of the RDS 100. A user 102 uses a local machine 104 to launch a browser 106 to access a dashboard application to interact with the RDS 100, connect to a remote device and to conduct tests on the remote device. In some embodiments, the dashboard website/web application may be replaced by a desktop application, which the user 102 can install on the local machine 104. The user 102 may be a software developer, such as a website developer, web application developer or a mobile application developer. The local machine 104, in a typical case, may be a laptop or desktop computer, which the user 102 can use to write software code, debug, or run tests on a website/web application or mobile application. The user 102 can enter a uniform resource locator (URL) 108 in the browser 106 to connect to the dashboard application powered by a server 110. The server 110 can enable the browser 106 and a remote device 114 to establish a connection. The RDS 100 can use the connection for streaming the display of a remote device 114 onto the browser 106 in order to mirror the display of the remote device 114 and present it to the user 102. The RDS 100 can also capture user inputs entered into the mirrored display and input them to the remote device 114.

The RDS 100 can include multiple datacenters 112 in various geographical locations. The datacenters 112 can include a variety of test devices for the users 102 to connect with and to conduct tests. In this description, the test devices in datacenters 112 are referred to as remote devices 114, as they are remote, relative to the user 102 and the user's local machine 104. A variety of communication networks 116 can be used to enable connection between the browser 106, the server 110 and the remote device 114. The remote devices 114 can include various hardware platforms, provided by various manufacturers, different versions of each brand (for example, old, midmarket, new) and optionally various copies of each brand, to enable availability for numerous users 102 to connect and conduct tests.

The RDS 100 can use a host 118 connected to one or more remote devices 114. In some embodiments, the browser 106 does not directly communicate with the remote device 114. The host 118 enables communication between the browser 106 and the remote device 114 through one or more private and/or public communication networks and other components of the RDS 100, such as the server 110 or other additional components. The host 118 can be a desktop, laptop, or other hardware connected with a wired or wireless connection to the remote device 114. The hardware used for the host 118 can depend on the type of the remote device 114 that it hosts. Examples of host 118 hardware can include Apple Mac Mini® computers for iPhone® and iOS® devices and Zotac® for Android® devices.

The RDS 100 mirrors the display of the remote device 114 on the browser 106, by generating a display 120 on the browser 106. In some embodiments, the display 120 can be a graphical, or pictorial replica representation of the remote device 114. For example, if an iPhone® 12 device is chosen, the display 120 can be an image of an iPhone® 12. The RDS 100 mirrors the display of the remote device 114 on the display 120 by streaming a video feed of the display of the remote device 114 on the display 120. In some embodiments, the video stream used to mirror the display of the remote device 114 is generated by capturing and encoding screenshots of the display of the remote device 114 into a video stream feed of high frames per second to give the user 102 a seamless interaction experience with the display 120. In other embodiments, the display 120 can be generated from a video stream from the remote device 114. Using input devices of the local machine 104, the user 102 can interact with the display 120, in the same manner as if the remote device 114 were locally present.

The RDS 100 captures and translates the user interactions to input commands compatible with the remote device 114 and inputs the translated input commands to the remote device 114. The display responses of the remote device 114 are then streamed to the user 102, via display 120. In some embodiments, the user 102 has access to and can activate other displays and menu options, such as developer tools display 122. An example usage of the RDS 100, from the perspective of the user 102, includes, the user 102, opening a browser on the remote device 114, via menu options provided by the dashboard application. The user 102 can access the dashboard application via the browser 106 on the user's local machine 104. The RDS 100 opens the user's selected browser on the remote device 114 and generates a display of the remote device 114 and the remotely opened browser on the browser 106 on the user's local machine 104. The user 102 can then use a mouse to click on a URL field 124 in the display 120, which corresponds to the URL field in the browser on the remote device 114. The user 102 can subsequently enter a URL address in the URL field 124. Simultaneously, the user's interactions, such as mouse clicks and keyboard inputs are captured and translated to the input commands compatible with the remote device 114 at the datacenter 112. For example, the mouse click in the URL field 124 is translated to a tap on the corresponding location on the display of the remote device 114 and the keyboard inputs are translated to keyboard inputs of the remote device 114, causing the remote device 114 to open the user requested URL and download the user requested website. Simultaneously, a video stream of the display of the remote device 114 is sent to and generated on the display 120 on browser 106. In this manner, the user perceives entering a URL in the URL field 124 and seeing the display 120 (a replica of the remote device 114) open the requested URL. Additional interactions of the user 102 can continue in the same manner. The user 102 can use the RDS 100 in the manner described above to perform manual or automated testing.

The display 120 is a pictorial and graphical representation of the remote device 114. The RDS 100 does not open a copy of the browser opened on the remote device 114 or conduct simultaneous parallel processes between the remote device 114 and the local machine 106. Instead, the RDS 100 streams a video feed from the remote device 114 to generate the display 120. Consequently, the user's interactions is inputted to the display 120, appearing as if a functioning browser is receiving the interactions, while the RDS 100 captures, transfers and translates those interactions to the remote device 114, where the functioning browser is operating on the remote device 114.

For some software development tasks, the developer may wish to test the software under different network connectivity statuses. In particular, the offline or low connectivity behavior of a software program may be of interest to some developers. Other developers may be interested in testing their online and/or offline behavior of their programs under varying network speeds to simulate the real-world scenarios their software may encounter. For example, a mobile device running a software program may at times have varying degrees and speeds of Internet connectivity under which the software program must operate. As an example, a media streaming program may locally buffer the streaming media as a counter measure to unpredictable network speeds and to deliver a seamless streaming service to a user. For such developers, testing software under varying network or Internet connectivity speeds can be valuable.

The RDS 100 uses network communication to generate the mirrored display of the remote device 114 on the browser 106. The network communication can also include use of the Internet. The remote device 114 is connected to communication networks, such as the Internet to provide streaming ability from the remote device 114 to the browser 106. Streaming can include streaming the display of the remote device 114 to the browser 106, but also streaming audio from the remote device 114 to the browser 106. A data channel can also transmit translated input commands, for example swipes, taps, pinches or other touch and keyboard inputs, from the browser 106 to the remote device 114. As such, while it is possible to toggle the network access of the remote device 114 ON and OFF, doing so, also would sever streaming, and the connection between the browser 106 and the remote device 114 at the datacenter. The described embodiments provide solutions for simulating low speed network or no network/Internet connectivity on the remote device 114 to test OFF or low connectivity status, while maintaining the streaming connection between the remote device 114 and the browser 106.

Figure 2:
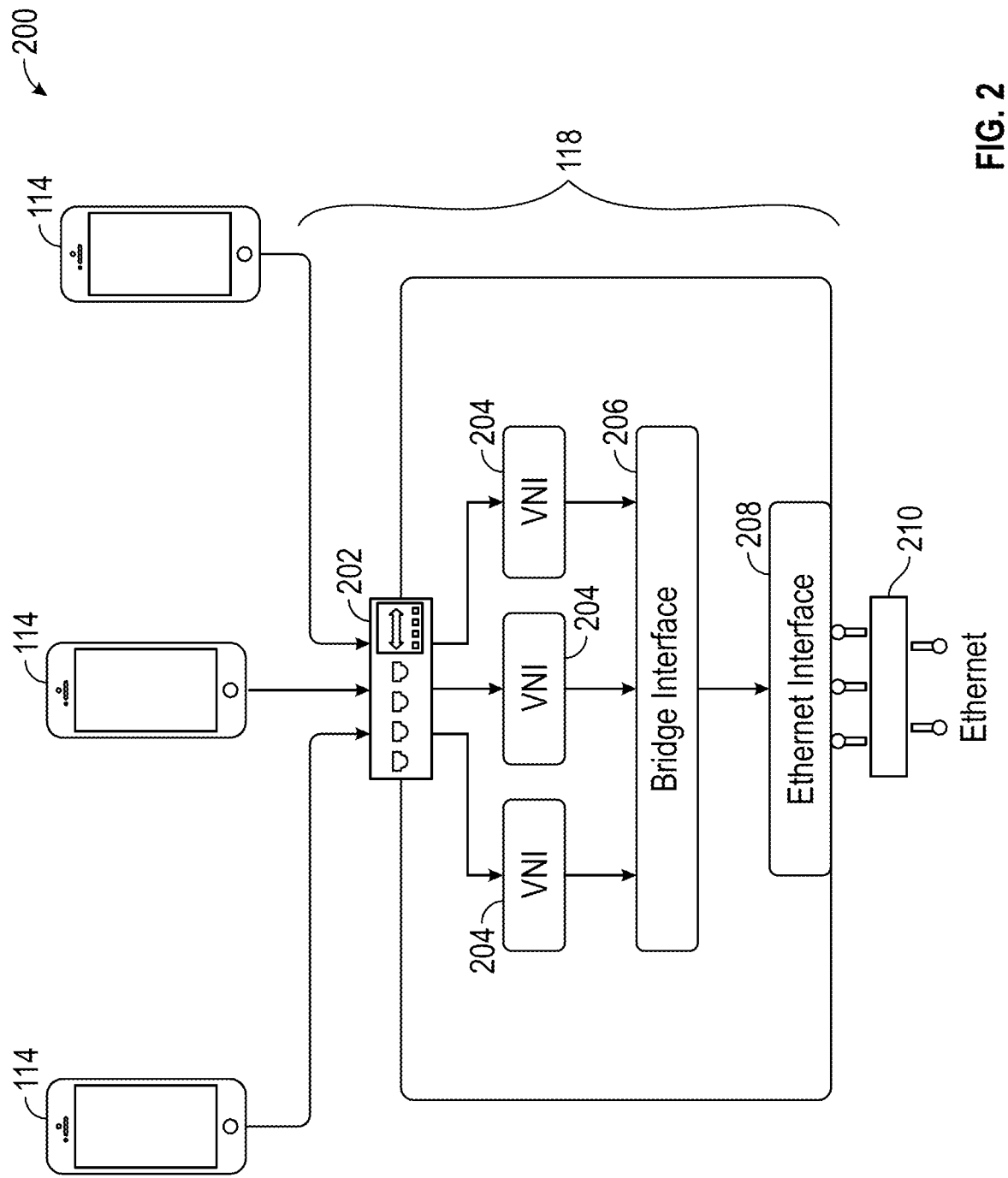
FIG. 2 illustrates an example diagram of the connection between a remote device and a host in the embodiment of FIG. 1.

FIG. 2 illustrates an example diagram 200 of the connection between the remote device 114 and the host 118. In this example, several hardware and software layers can exist between the remote device 114 and the Internet. For example, several remote devices 114 can be connected via a universal serial bus (USB) hub 202 to the host 118. In some embodiments, each USB connection from a remote device 114 is mapped to a virtual network interface (VNI) 204. The VNIs 204 are connected to a bridge interface 206. The bridge interface 206 is another layer of handling Internet/network traffic. The bridge interface 206 is connected to an ethernet interface 208. The ethernet interface 208 of the host 118 is connected to a communication network, such as the Internet through an ethernet 210. The described connections are provided as examples only. The described technology can be implemented by a variety of connections, including wireless connections, such as WiFi or other connection technologies. Regardless of the connection used, a hardware and/or software layer is responsible for directing network traffic to and from a remote device 114 and its associated VNI 204. A network filtering command can be executed at the VNI 204 with respect to a selected remote device 114 to modulate the flow of network traffic to and from the selected remote device 114 and the applications installed therein.

The network filtering command can be configured in a variety of formats. For example, the network filtering command can include instructions to block or reduce the speed of any traffic from all applications installed on the remote device, except the streaming application used by the RDS 100. In some embodiments, the network filtering command can include instructions to reduce the speed of network traffic, based on and to simulate the speed of a particular cellular network infrastructure. For example, the reduction in speed can correspond to what a slow down on a 2G, 3G, 4G or 5G might be on a remote device 114 if the device were to be connected to such a network.

Figure 3:
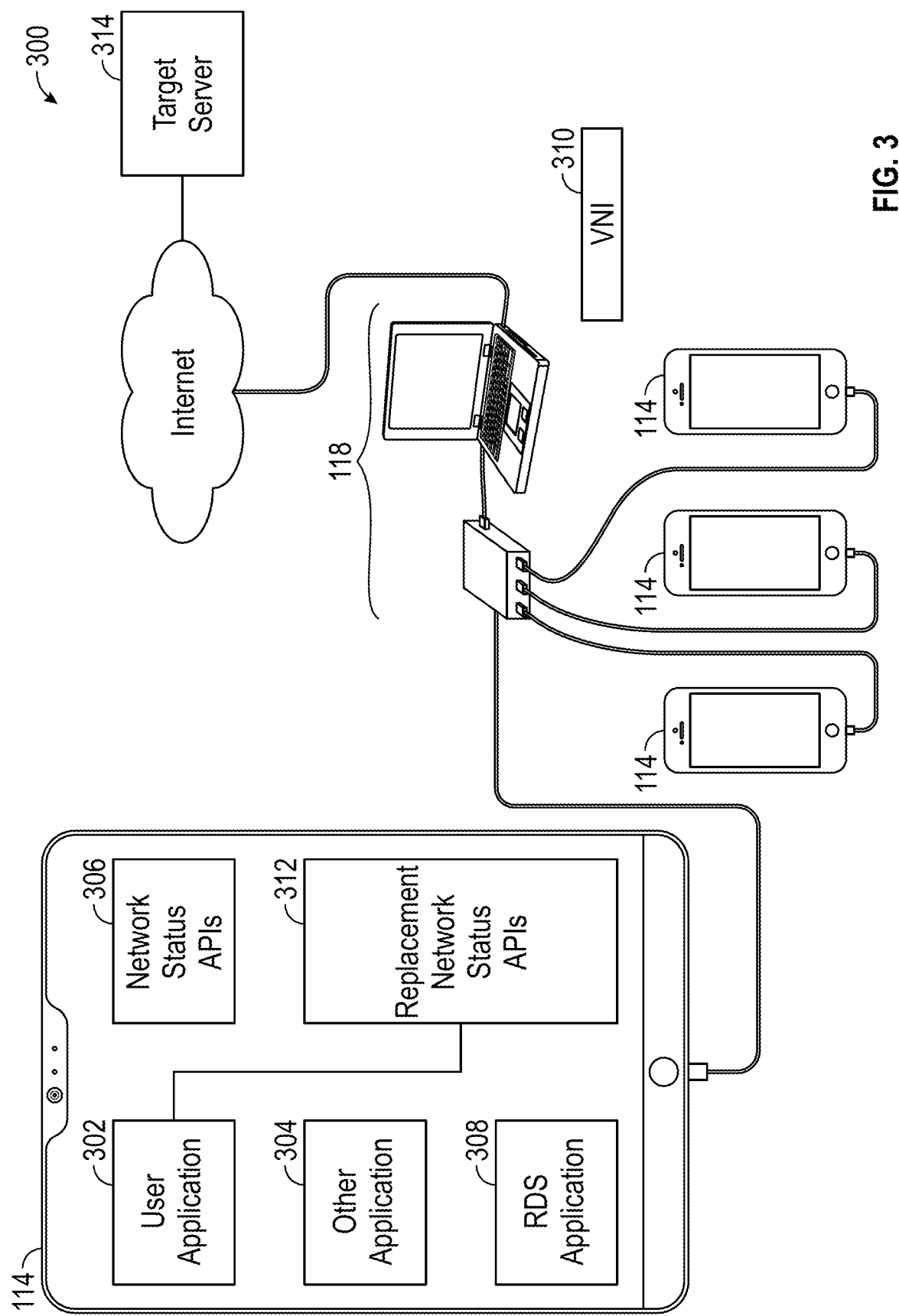
FIG. 3 illustrates a diagram of an environment in which offline or low connectivity network status can be simulated.

FIG. 3 illustrates a diagram of an environment 300 in which offline or low connectivity network status can be simulated, without loss of connection for a streaming application. The remote device 114 is connected to a host 118. The remote device 114 can include a variety of applications, for example, a user application 302 for which a user 102 may select to test offline or low connectivity mode. The user application 302 may or may not interface with other applications 304 on the remote device 114. Other applications 304 may or may not connect to the Internet, depending on their type and usage. The remote device 114 can also include an RDS application 308. The RDS application 308 can be a streaming application, provided by an administrator of the RDS 100, responsible for establishing a network communication link between the remote device 114 and the browser 106. The RDS application 308 can be implemented by a variety of communication networks, including for example peer-to-peer (P2P) communication networks, such as web real time communication (WebRTC). The RDS application 308 may stream video, audio and/or data to conduct a mirroring of the remote device 114 on the browser 106 and to receive user commands/inputs from the browser 106.

The communication link between the remote device 114 and the browser 106 can include several software and hardware layers, but the communication link, at least in part is established by or includes a virtual network interface (VNI) layer 310 installed on the host 118. To simulate no network or low connectivity status, a network filtering command can be executed at the VNI layer 310. The filtering command can include instructions to slow down or block traffic from the user application 302 or other applications 304, while allowing traffic to and from the RDS application 308. In some embodiments, the VNI layer 310 and the network filtering commands are facilities, APIs and functionality provided by the operating system of the host 118. A user interface (UI) command on the browser 106 can let the user 102 to signal the RDS 100 to enable offline or low connectivity mode on the user application 302 running on the remote device 114. The request is received at the RDS 100 and routed through various layers of the RDS 100 to the host 118 corresponding to the remote device 114 for which the user 102 has requested an offline mode. A server running on the host 118 can receive the offline or low connectivity mode request and execute the network filtering command. In some embodiments, the network filtering command can include instructions that blocks or slows down all traffic to and from the remote device 114, except for a selected list of applications. In this scenario, the exception list would include the RDS application 308. In this manner, the RDS application 308 can continue to stream the remote device 114 to the browser 106, and receive commands/inputs from the browser 106, while the user application 302 and other applications 304 are effectively blocked or slowed down from accessing outside communication networks. The user 102 can test the offline or low connectivity software flows of the user application 302.

The remote device 114 can also include network status application programming interfaces (APIs) 306 provided by the operating system of the remote device 114. These APIs can relay, broadcast, or otherwise provide a network status of the remote device 114 to any application that utilizes their services, including the user application 302. Application developers can make network error handling flows of their applications more robust by integrating the services of the network status APIs 306. An example of a network status API 306 in the iOS environment are reachability APIs provided by the iOS. Android and other operating systems have similar APIs. The network status APIs 306 check whether there is a network connection to the remote device 114, and not whether the remote device 114 actually has Internet access or whether a target server 314 is responding to traffic requests. The target server 314 can be server accessible by the Internet. If a device is connected to a WiFi access point, and the access point's Internet connection is down, the network status APIs 306 indicate a positive network access. Similarly, if a working Internet connection to the WiFi access point exists, but the remote devices access to the WiFi access point is experiencing errors or is slowed down, the network status APIs 306 still indicate a positive network access. In other words, the network status APIs 306 in some operating systems account only for local environment and connectivity in the local environment.

In the environment of the RDS 100, and for user applications 302 that utilize the network status APIs 306, those APIs would always indicate a network ON status since the remote device 114 is connected to a local network through the host 118 via which the RDS application 308 can stream the remote device 114 to the browser 106. For user applications 302 that utilize the network status APIs 306, replacement network status APIs 312 can be used to simulate an offline connectivity status. The user application 302 software calls and requests for service from the network status APIs 306 can be replaced with calls and requests to replacement network status APIs 312. To simulate an offline mode, the replacement network status APIs 312 can issue an offline or low connectivity status to the user application 302, even as the remote device 114 is connected to a network with functioning network communication link, and the network status APIs 306 may be broadcasting a network ON status.

To replace the network status APIs 306, the user application 302 can be decompiled and requests for input from the network status APIs 306 can be replaced with requests for inputs from the replacement network status APIs 312. The user application 302 with the modified calls to replacement network status APIs 312 can be recompiled and installed on the remote device 114. When the user 102 enables the offline status, the modified user application 302 interfaces with the replacement network status APIs 312, instead of the network status APIs 306. The VNI layer 310 can also execute a network filtering command to block traffic access from the user application 302. In this scenario, the user application 302 receives a network OFF status from the replacement network status APIs 312 and also cannot transmit or receive traffic (because of blocking by the network filtering command at the VNI layer 310). These conditions trigger an offline or low connectivity workflow of the user application 302, so the user 102 can test those workflows, while the RDS application 308 can continue streaming the display, audio and/or data of the remote device 114 between the remote device 114 and the browser 106 for the user 102 to observe and test the offline or low connectivity behavior of the user application 302.

Figure 4:
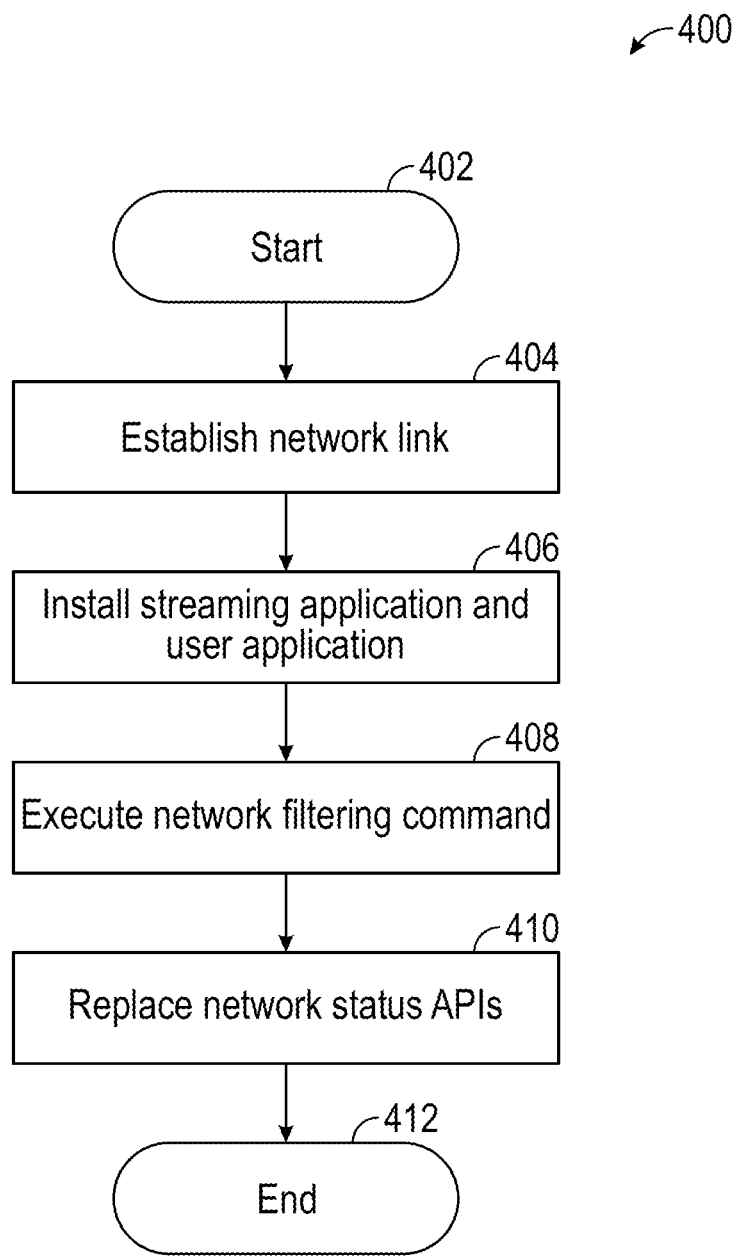
FIG. 4 illustrates a flowchart of a method of simulating offline mode on a remote device in the environment of the embodiment of FIG. 1.

FIG. 4 illustrates a flowchart of a method 400 of simulating offline mode on a remote device in the environment of the RDS 100. The method starts at step 402. At step 404, a network communication link between a browser 106 and a remote device 114 is established. Establishing the network communication link can include establishing a P2P network, such as WebRTC. At step 406, an RDS application 308 can be installed on the remote device 114. The RDS application 308 can be a streaming application. When WebRTC is used, the RDS application 308 can be a WebRTC application installed on the remote device 114 that facilitates streaming and communication from the remote device 114 to the browser 106. When WebRTC is used, the browser 106 can decode the data received over the WebRTC from the remote device 114. In some embodiments, the installation of the RDS application at step 406 may occur before a network communication link can be established at step 404. At step 406, once the network communication link is established, the RDS application 308 can also install a user application 302 for testing and development on the remote device 114. The network communication link can include various channels, such as video, audio and data. The video channel can be used to stream a video feed of the display of the remote device 114 into the browser 106. The audio channel can be used to stream the audio output of the remote device 114 to the browser 106. The data channel can be used to translate and transmit commands/inputs, for example, touch screen gestures such as tap, pinch to zoom, long press, or other touch screen gestures to the remote device 114.

At step 408, upon receiving a request for enabling offline mode, a network filtering command can be executed to block traffic to and from the user application 302. The network filtering command can be configured to allow network traffic to and from the RDS application 308, while blocking network access to and from the user application 302 and other applications 304. In some embodiments, the network filtering command is provided by an operating system of a host 118 to which the remote device 114 is connected. The network filtering command may be configured to slow down the transmission of data packets and traffic to and from the user application 302 and other applications 304. In some embodiments, the slowing down is based on and to simulate slow down in a particular cellular network infrastructure, such as 3G, 4G, 5G, LTE, and the like. Blocking and/or slowing down can be accomplished by erasing some data packets or not routing the packets or traffic to a next network communication layer beyond the remote device 114 and the host 118. The network filtering command can be executed in a virtual network interface (VNI) layer 310 at the host 118.

At step 410, for those user applications 302 that interface with network status APIs 306, a replacement operation can be performed, where the software calls for APIs 306 are replaced with software calls to a replacement network status APIs 312. The replacement APIs 312 provide a network OFF status to the user application 302, regardless of the existence of the active network connection on the remote device 114. The replacement operation can include unpacking the user application and replacing its calls to system network status APIs 306 with calls to replacement network status APIs 312. The step 410 can be skipped for user applications 302 that do not interface with the system network status APIs 306. The method ends at step 412.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 5:
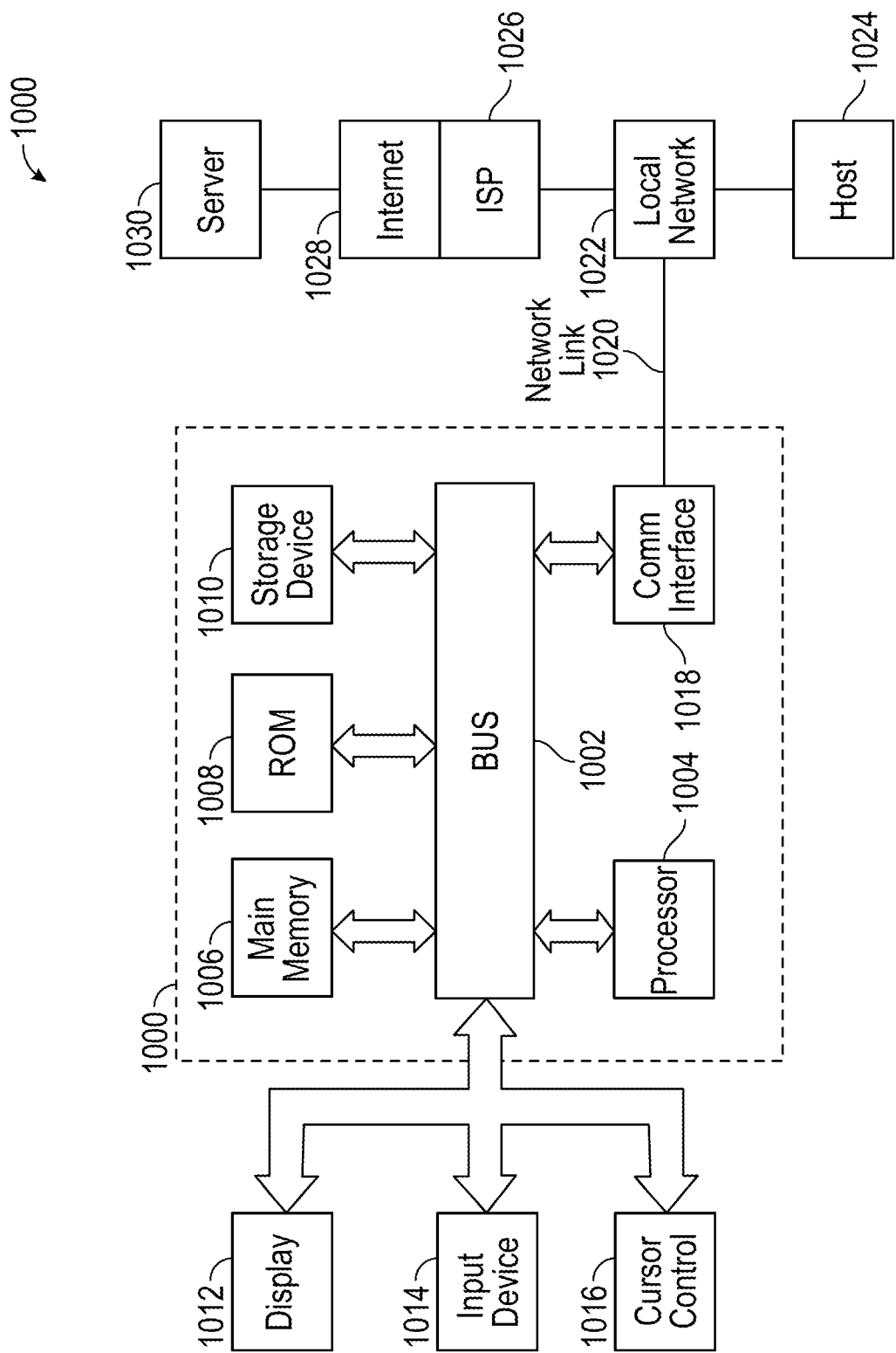
FIG. 5 is a block diagram that illustrates a computer system upon which an embodiment of can be implemented.

For example, FIG. 5 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: establishing a network communication link between a browser at a first location and a remote device at a second location, wherein the network communication link comprises a virtual network interface layer; installing a streaming application on the remote device, wherein the streaming application is configured to stream, via the communication network link, a display of the remote device to the browser; receiving a request from the browser to enable offline mode on the remote device; and executing a network filtering command, instructing the virtual network interface layer to block or reduce transmission speed of network traffic to and from a user application installed on the remote device, while allowing network traffic to and from the streaming application.

Example 2: The method of Example 1, wherein the remote device is electrically coupled to a host, wherein the virtual network interface layer and the network filtering command are provided by an operating system of the host.

Example 3: The method of some or all of Examples 1 and 2, wherein the user application comprises requests to a network status API provided by an operating system of the remote device, wherein the method further comprises replacing the user application requests to the network status APIs with requests to a replacement network status API, wherein the replacement network status API is configured to signal a lack of network connectivity status to the user application.

Example 4: The method of some or all of Examples 1-3, wherein the network status API comprises an iOS reachability API.

Example 5: The method of some or all of Examples 1-4, wherein reducing transmission speed is based on simulating network speeds.

Example 6: The method of some or all of Examples 1-5, wherein the remote device is electrically coupled to a host and the host comprises a server configured to receive a request for offline mode from the browser and the server is configured to signal the host to execute the network filtering command.

Example 7: A non-transitory computer storage that stores executable program instructions that, when executed by one or more computing devices, configure the one or more computing devices to perform operations comprising: establishing a network communication link between a browser at a first location and a remote device at a second location, wherein the network communication link comprises a virtual network interface layer; installing a streaming application on the remote device, wherein the streaming application is configured to stream, via the communication network link, a display of the remote device to the browser; receiving a request from the browser to enable offline mode on the remote device; and executing a network filtering command, instructing the virtual network interface layer to block or reduce transmission speed of network traffic to and from a user application installed on the remote device, while allowing network traffic to and from the streaming application.

Example 8: The non-transitory computer storage of Example 7, wherein the remote device is electrically coupled to a host, wherein the virtual network interface layer and the network filtering command are provided by an operating system of the host.

Example 9: The non-transitory computer storage of some or all of Examples 7 and 8, wherein the user application comprises requests to a network status API provided by an operating system of the remote device, wherein the method further comprises replacing the user application requests to the network status APIs with requests to a replacement network status API, wherein the replacement network status API is configured to signal a lack of network connectivity status to the user application.

Example 10: The non-transitory computer storage of some or all of Examples 7-9, wherein the network status API comprises an iOS reachability API.

Example 11: The non-transitory computer storage of some or all of Examples 7-10, wherein reducing transmission speed is based on simulating network speeds.

Example 12: The non-transitory computer storage of some or all of Examples 7-11, wherein the remote device is electrically coupled to a host and the host comprises a server configured to receive a request for offline mode from the browser and the server is configured to signal the host to execute the network filtering command.

Example 13: A system comprising a processor, the processor configured to perform operations comprising: establishing a network communication link between a browser at a first location and a remote device at a second location, wherein the network communication link comprises a virtual network interface layer; installing a streaming application on the remote device, wherein the streaming application is configured to stream, via the communication network link, a display of the remote device to the browser; receiving a request from the browser to enable offline mode on the remote device; and executing a network filtering command, instructing the virtual network interface layer to block or reduce transmission speed of network traffic to and from a user application installed on the remote device, while allowing network traffic to and from the streaming application.

Example 14: The system of Example 13, wherein the remote device is electrically coupled to a host, wherein the virtual network interface layer and the network filtering command are provided by an operating system of the host.

Example 15: The system of some or all of Examples 13 and 14, wherein the user application comprises requests to a network status API provided by an operating system of the remote device, wherein the method further comprises replacing the user application requests to the network status APIs with requests to a replacement network status API, wherein the replacement network status API is configured to signal a lack of network connectivity status to the user application.

Example 16: The system of some or all of Examples 13-15, wherein the network status API comprises an iOS reachability API.

Example 17: The system of some or all of Examples 13-16, wherein reducing transmission speed is based on simulating network speeds.

Example 18: The system of some or all of Examples 13-17, wherein the remote device is electrically coupled to a host and the host comprises a server configured to receive a request for offline mode from the browser and the server is configured to signal the host to execute the network filtering command.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
   establishing a network communication link between a browser, installed on a local machine at a first location and a host, coupled to a remote device at a second location through a virtual network interface layer, wherein the host is configured to provide network communication to the remote device via the virtual network interface layer;
   installing a streaming application on the remote device, wherein the streaming application is configured to stream, via the network communication link, a display of the remote device to the browser;
   receiving a request from the browser to enable offline mode on the remote device;
   executing a network filtering command, on the virtual network interface layer resident on the host, instructing the virtual network interface layer to block or reduce transmission speed of network traffic to and from a user application installed on the remote device, while allowing network traffic to and from the streaming application, wherein the user application comprises requests to a network status application programming interface (API) provided by an operating system of the remote device;
   decompiling the user application;
   detecting calls in the user application for input from the network status application programing interface (API) of the operating system of the host;
   generating modified calls, by replacing the detected calls in the user application to the network status APIs of the operating system of the host, with calls for input from a replacement network status API;
   recompiling the user application with the modified calls; and
   installing the user application with the modified calls on the remote device,
   wherein the replacement network status API is configured to signal a blocked or reduced transmission speed status to the user application.

2. The method of claim 1, wherein the virtual network interface layer and the network filtering command are provided by the operating system of the host.

3. The method of claim 1, wherein the network status API comprises an operating system reachability API.

4. The method of claim 1, wherein reducing transmission speed is based on simulating network speeds.

5. The method of claim 1, wherein the host comprises a server configured to receive a request for offline mode from the browser and the server is configured to signal the host to execute the network filtering command.

6. The method of claim 1, wherein a plurality of remote devices are coupled to the host via universal serial bus (USB) connections, wherein each USB connection of a remote device to the host is mapped to a virtual network interface (VNI) resident on the host, wherein the plurality of the VNIs are coupled to an Ethernet interface.

7. A non-transitory computer storage that stores executable program instructions that, when executed by one or more computing devices, configure the one or more computing devices to perform operations comprising:
   establishing a network communication link between a browser, installed on a local machine at a first location and a host, coupled to a remote device at a second location through a virtual network interface layer, wherein the host is configured to provide network communication to the remote device via the virtual network interface layer;
   installing a streaming application on the remote device, wherein the streaming application is configured to stream, via the network communication link, a display of the remote device to the browser;
   receiving a request from the browser to enable offline mode on the remote device;
   executing a network filtering command, on the virtual network interface layer resident on the host, instructing the virtual network interface layer to block or reduce transmission speed of network traffic to and from a user application installed on the remote device, while allowing network traffic to and from the streaming application, wherein the user application comprises requests to a network status application programming interface (API) provided by an operating system of the remote device;
   decompiling the user application;
   detecting calls in the user application for input from the network status application programing interface (API) of the operating system of the host;

generating modified calls, by replacing the detected calls in the user application to the network status APIs of the operating system of the host, with calls for input from a replacement network status API;

recompiling the user application with the modified calls; and installing the user application with the modified calls on the remote device, wherein the replacement network status API is configured to signal a blocked or reduced transmission speed status to the user application.

8. The non-transitory computer storage of claim 7, wherein the virtual network interface layer and the network filtering command are provided by the operating system of the host.

9. The non-transitory computer storage of claim 7, wherein the network status API comprises an operating system reachability API.

10. The non-transitory computer storage of claim 7, wherein reducing transmission speed is based on simulating network speeds.

11. The non-transitory computer storage of claim 7, wherein the host comprises a server configured to receive a request for offline mode from the browser and the server is configured to signal the host to execute the network filtering command.

12. The non-transitory computer storage of claim 7, wherein a plurality of remote devices are coupled to the host via universal serial bus (USB) connections, wherein each USB connection of a remote device to the host is mapped to a virtual network interface (VNI) resident on the host, wherein the plurality of the VNIs are coupled to an Ethernet interface.

13. A system comprising a processor, the processor configured to perform operations comprising:

establishing a network communication link between a browser, installed on a local machine at a first location and a host, coupled to a remote device at a second location through a virtual network interface layer;

installing a streaming application on the remote device, wherein the streaming application is configured to stream, via the network communication link, a display of the remote device to the browser;

receiving a request from the browser to enable offline mode on the remote device;

executing a network filtering command, on the virtual network interface layer resident on the host, instructing the virtual network interface layer to block or reduce transmission speed of network traffic to and from a user application installed on the remote device, while allowing network traffic to and from the streaming application, wherein the user application comprises requests to a network status application programming interface (API) provided by an operating system of the remote device;

decompiling the user application;

detecting calls in the user application for input from the network status application programing interface (API) of the operating system of the host;

generating modified calls, by replacing the detected calls in the user application to the network status APIs of the operating system of the host, with calls for input from a replacement network status API;

recompiling the user application with the modified calls; and installing the user application with the modified calls on the remote device, wherein the replacement network status API is configured to signal a blocked or reduced transmission speed status to the user application.

14. The system of claim 13, wherein the virtual network interface layer and the network filtering command are provided by the operating system of the host.

15. The system of claim 13, wherein the network status API comprises an operating system reachability API.

16. The system of claim 13, wherein reducing transmission speed is based on simulating network speeds.

17. The system of claim 13, wherein the host comprises a server configured to receive a request for offline mode from the browser and the server is configured to signal the host to execute the network filtering command.

* * * * *